Nov. 12, 1940.  S. SMITH  2,221,387

POWER TAKE-OFF

Filed Oct. 29, 1938  2 Sheets-Sheet 1

INVENTOR.
Stanford Smith,
BY
ATTORNEY.

Nov. 12, 1940.  S. SMITH  2,221,387
POWER TAKE-OFF
Filed Oct. 29, 1938  2 Sheets-Sheet 2
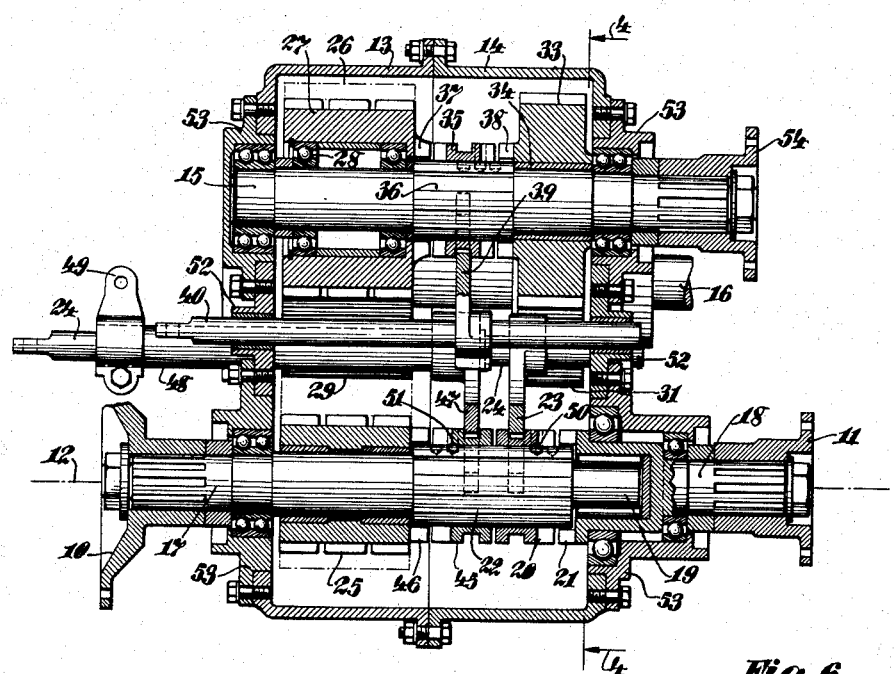
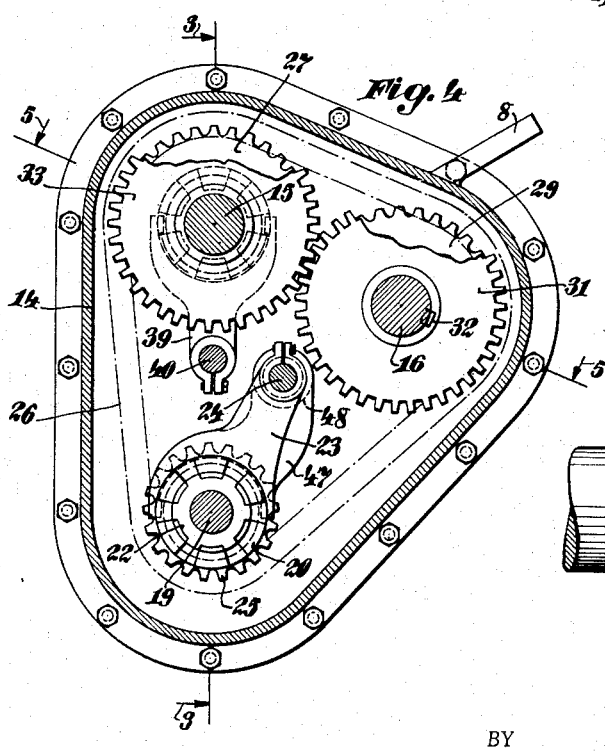
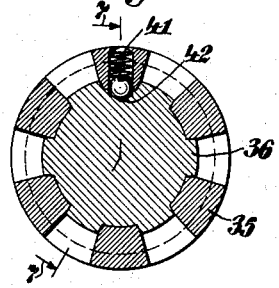
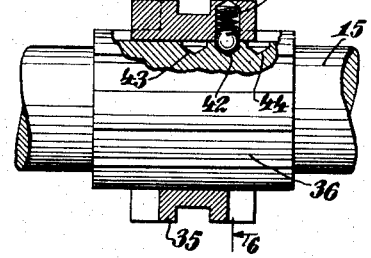
INVENTOR.
Stanford Smith,
BY
Philip S. M^_____
ATTORNEY.

Patented Nov. 12, 1940

2,221,387

UNITED STATES PATENT OFFICE 2,221,387

POWER TAKE-OFF

Stanford Smith, New York, N. Y.

Application October 29, 1938, Serial No. 237,632

4 Claims. (Cl. 74—11)

The invention herein disclosed relates to devices generally known as power take-offs.

Objects of the invention are to provide a device of the type mentioned, which may be readily installed, interposed in a line of power shafting and which will provide both forward and reverse drive and desired interchangeability of parts, enabling power to be taken off at either or both ends of the power unit.

Other objects of the invention are to provide a power take-off unit of simple, sturdy design, well capable of carrying the heavy loads and strains to which such devices may be subjected.

Further objects and the novel features of construction, combinations and relations of parts by which the objects are attained will appear or are hereinafter set forth.

The drawings accompanying and forming part of the following specification illustrate one of the practical commercial embodiments of the invention. The structure however is subject to change and modification, all within the true spirit and broad scope of the invention as hereinafter defined and claimed.

Fig. 3 is a broken longitudinal sectional view of the unit as on substantially the plane of line 3—3 of Fig. 4.

Fig. 4 is a broken transverse sectional view as on substantially the plane of line 4—4 of Fig. 3.

Figs. 6 and 7 are broken sectional details of the double sliding clutch member, Fig. 6 being a cross-section as on line 6—6 of Fig. 7.

Figure 1:
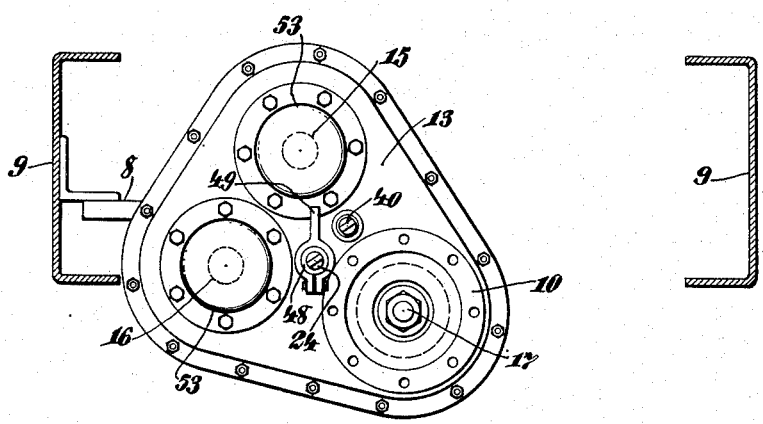
Fig. 1 is a front end view of the take-off unit as installed in a motor truck, the frame of the latter being indicated in section.
Figure 2:
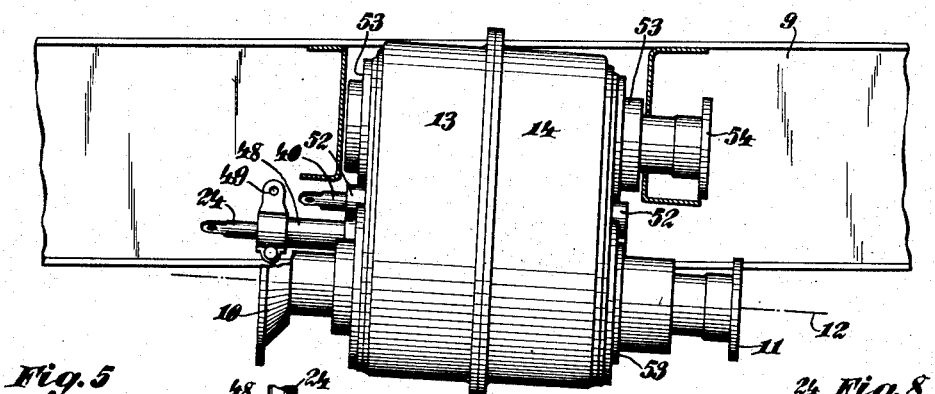
Fig. 2 is a side elevation of the unit, with parts of the truck frame broken away and appearing in section.

In Figs. 1 and 2, the device is illustrated in the form of a power take-off for motor trucks and is indicated as supported by suitable brackets 8, in the frame 9, of a truck in position to bring the forward and rearward couplings 10, 11, of the lower, split power shaft in line with the axis 12 of the propeller shafting of the truck.

The casing of the unit is shown as made up of two flanged sections 13, 14, bolted together at their meeting faces, which sections may be duplicates for the purpose of enabling full interchangeability and reversability of parts. The casing is of generally triangular cross-section to carry three shafts, the main split power shaft, which is coupled in the line of propeller shafting, and above that, a take-off shaft 15, and a take-off reversing shaft 16.

The forward portion of the power shaft, which in the present instance, is coupled at 10, with the shaft extending rearwardly from the engine transmission is designated 17, and the rearward section which is coupled at 11, with the propeller shaft extending to the differential of the truck is designated 18, Fig. 3. The rearward end of the forward section is shown piloted at 19, in the forward end of the rear section and the two sections are ad..pted to be coupled together by companion jaw clutch elements 20, 21, the first being splined at 22, on shaft 17, and shiftable by fork 23, carried by shifter shaft 24.

Rotatably mounted on the forward portion of the main, power shaft 17, ahead of the splined portion 22, is a sprocket pinion 25, carrying a link sprocket chain 26, running up over a sprocket pinion 27, rotatably mounted at 28, on the take-off shaft 15, and about a sprocket 29, keyed at 30, on the reversing shaft 16. For speed reduction purposes, the sprocket gear 27, on the take-off shaft is shown as of larger diameter than the driving pinion 25, on the power shaft, but this relation may be reversed or both gears be of the same pitch diameter, depending upon requirements and purposes of the power take-off unit.

Figure 5:
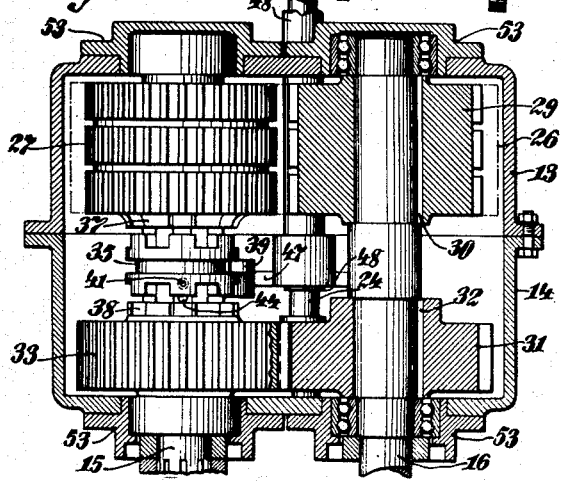
Fig. 5 is a broken sectional view on substantially the plane of line 5—5 of Fig. 4.
Figure 8:
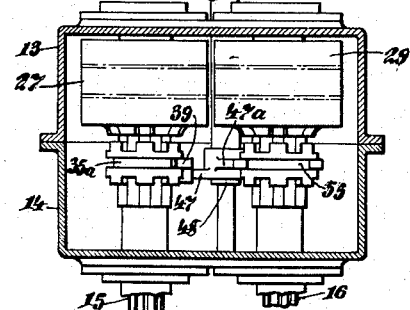
Fig. 8 is a sectional detail of a modification.

The direction reversing shaft 16, is shown in Fig. 5, as having a spur gear 31, keyed on the rearward portion of the same at 32, in mesh with a companion spur gear 33, rotatably mounted at 34, Fig. 3, on the take-off shaft.

A double faced jaw clutch member 35, is shown slidingly splined at 26, on the take-off or output shaft 15, engageable by movement in one direction or the other with the jaw clutch teeth 37, on the end of sprocket gear 27, or with jaw clutch teeth 38, on the end of spur gear 33. This dual jaw clutch member is shown as shiftable in opposite directions by a fork 39, carried by a shifter rod 40, and as having a spring detent 41, engageable in notches 42, 43, or 44, respectively, Fig. 7, for holding the clutch in neutral or in forward or reverse take-off positions.

The chain drive sprocket 25, is coupled to and uncoupled from the forward "live" portion 17, of the power shaft by a jaw clutch sleeve 45, Fig. 3, sliding on the splined portion 22, of this shaft and engageable with companion clutch teeth 46, on the opposing end of the pinion 25. This clutch element is shown as shiftable by a fork 47, carried by a tubular shaft 48, sleeved over the shifter rod 24. In Figs. 1 and 3, this shifter sleeve is shown as having a split clamp 49 engaged thereon for connection with a shifter lever or other suitable controller.

The clutch sleeve 20, for coupling and uncoupling the power shaft sections and the clutch sleeve 45, for coupling and uncoupling the output gearing are shown as having suitable spring retainers 50, 51, for holding these clutches in engaged and disengaged positions.

The concentric shifter rods 24, 48, and shifter rod 40, are indicated as slidingly supported in bearing bushings 52, Fig. 3, removably and interchangeably mounted in the opposite ends of the casing, enabling the controls to be brought out at either end of the casing.

Similarly, the shaft bearings designated generally at 53, may be removably and interchangeably mounted in the opposite ends of the casing, so that power may be taken off at either end. If desired, the bearings for the output and reversing shafts may be open-ended bearings and these shafts be extended out through opposite ends of the casing, instead of as in the illustration, having closed bearings at the front and taking off power only at the back of the unit.

The output shaft 15, is shown in Figs. 2 and 3, as carrying a flange collar 54, for connection with the mechanism to which power is to be transmitted. In Figs. 3 and 5, the reversing shaft 16 is shown as extended out through the back of the casing, to indicate that this may be used for power purposes, if required, at the same time with and independently of power taken off from the power shaft 15. The latter feature may be important where two different power consuming devices are to be driven at the same time and possibly at different speeds. Such an instance might be the case of an air compressor driven at one speed, say from shaft 15, and an electric welder at the same time driven at a different speed from shaft 16. Other examples and uses will occur to engineers skilled in this art.

If at all times the output shaft or shafts is or are to be driven always in the same direction, the direction reversing gears may be omitted and both sprocket gears 27 and 29, be loose on the respective shafts 15 and 16, and clutches 35a, 55, be employed for coupling and uncoupling each on its respective shaft, the same being operable by fork 39 on shifter rod 40, and by a fork 41a, extended up from shifter sleeve 48.

Various other modifications may be readily made, particularly because of the interchangeability and reversibility of parts.

In the particular form of construction illustrated, power may be taken off at any time and regardless of whether or not the truck is in motion. This is so because of the fact that the power output clutch 45, may be closed or opened, irrespective of the condition of the through drive clutch 20. When the vehicle is running and output power is not required, the clutch 45 is left open and the take-off gearing is then all quiet.

With output clutch 45 closed and dual clutch sleeve 35, shifted forward into engagement with sprocket gear 27, shaft 15 will be driven, say in a forward direction, the reverse gears 31, 33, then turning idly. When clutch sleeve 35 is shifted rearwardly in engagement with spur gear 33, the latter will be keyed to shaft 15 and such shaft then be driven in the reverse direction.

The direction reversing shaft 16 is driven through the chain 28 whenever output clutch 45, is closed, irrespective of whether clutch member 35 is in the neutral or in the forward or reverse drive positions. Consequently, shaft 15 may be idle, while power is being taken off from shaft 16. With clutch 35 closed, in one direction or the other, shaft 15 may be driven either forwardly or backwardly, at the same time power is being taken off shaft 16. By reason of the reversibility of the shaft bearings, the parts may be arranged to take off power from one shaft at one end of the casing and power from the other shaft at the opposite end of the casing. Instead of positive, jaw clutches, disc or frictional clutches may in some instances be employed.

What is claimed is:

1. A power take-off unit comprising a casing, a split power shaft journalled in said casing, clutch means for coupling and uncoupling the sections of said split power shaft, a chain sprocket loosely mounted on the "live" section of said split power shaft, means for clutching and declutching said chain sprocket on said live shaft section, a power output and a direction reversing shaft journalled in the casing in parallel relation to the split power shaft, chain sprockets on said output and direction reversing shafts, a chain operating over said sprockets, means for effecting clutching and declutching of one of said last mentioned chain sprockets and the shaft on which it is mounted and means for controlling the driving effect of the chain sprocket which is mounted on the other of said output and reversing shafts.

2. A power take-off unit, comprising a casing, a split power shaft journalled in said casing, clutch means for coupling and uncoupling the sections of said split power shaft, a chain sprocket loosely mounted on the "live" section of said split power shaft, means for clutching and declutching said chain sprocket on said live shaft section, a power output and a direction reversing shaft journalled in the casing in parallel relation to the split power shaft, chain sprockets on said output and direction reversing shafts, a chain operating over said sprockets, means for effecting clutching and declutching of one of said last mentioned chain sprockets and the shaft on which it is mounted, and means for controlling the driving effect of the chain sprocket which is mounted on the other of said output and reversing shafts, said last mentioned means including spur gearing between said last mentioned shafts and clutch mechanism controlling said spur gearing.

3. A power take-off unit, comprising a casing, a split power shaft journalled in said casing, clutch means for coupling and uncoupling the sections of said split power shaft, a chain sprocket loosely mounted on the "live" section of said split power shaft, means for clutching and declutching said chain sprocket on said live shaft section, a power output and a direction reversing shaft journalled in the casing in parallel relation to the split power shaft, chain sprockets on said output and direction reversing shafts, a chain operating over said sprockets, means for effecting clutching and declutching of one of said last mentioned chain sprockets and the shaft on which it is mounted, means for controlling the driving effect of the chain sprocket which is mounted on the other of said output and reversing shafts, said last mentioned means including spur gearing between said last mentioned shafts, said spur gearing including a loose spur gear opposed to one of said chain sprockets and the last mentioned clutch means aforesaid including a clutch sleeve interposed between said loose spur gear and said opposed chain sprocket.

4. A power take-off unit, comprising in combination with a split power shaft and clutch for coupling and uncoupling the sections of said split power shaft, a pair of shafts in parallel relation with said split power shaft, chain sprockets on said power shaft and parallel shafts, a chain operating over said sprockets, a clutch for coupling and uncoupling the chain sprocket on said power shaft, a clutch for coupling and uncoupling the chain sprocket on one of the other two shafts, motion reversing gears between said last mentioned shaft and the remaining shaft and clutch means controlling drive of said motion reversing gears.

STANFORD SMITH.